United States Patent
Tu et al.

(10) Patent No.: US 11,875,531 B1
(45) Date of Patent: Jan. 16, 2024

(54) DETECTION METHOD, ELECTRONIC DEVICE, AND COMPUTER-READABLE STORAGE MEDIUM

(71) Applicant: CONTEMPORARY AMPEREX TECHNOLOGY CO., LIMITED, Ningde (CN)

(72) Inventors: Yinhang Tu, Ningde (CN); Xiaofeng Liu, Ningde (CN); Shichuang Song, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/338,358

(22) Filed: Jun. 21, 2023

Related U.S. Application Data

(63) Continuation of application No. PCT/CN2021/118094, filed on Sep. 14, 2021.

(51) Int. Cl.
G06T 7/73 (2017.01)
G06V 10/141 (2022.01)
G06V 10/10 (2022.01)
G06T 7/62 (2017.01)

(52) U.S. Cl.
CPC ............ *G06T 7/73* (2017.01); *G06T 7/62* (2017.01); *G06V 10/141* (2022.01); *G06V 10/16* (2022.01)

(58) Field of Classification Search
CPC ....... G06T 7/0004; G06T 7/0006; G06T 7/33; G06T 7/70; G06T 7/73; G06T 7/97; G06T 2207/30108; G06T 2207/30152; G06V 10/141; G06V 10/16
See application file for complete search history.

(56) References Cited

FOREIGN PATENT DOCUMENTS

| CN | 108355981 A | 8/2018 |
|----|-------------|--------|
| CN | 209200016 U | 8/2019 |
| CN | 111479380 A | 7/2020 |
| CN | 211726359 U | 10/2020 |
| JP | 2000233488 A | 8/2000 |
| JP | 2003094183 A | 4/2003 |

OTHER PUBLICATIONS

International Search Report received in the corresponding International Application PCT/CN2021/118094, dated Jun. 13, 2022.
Written Opinion received in the corresponding International Application PCT/CN2021/118094, dated Jun. 13, 2022.
The extended European Search Report received in the corresponding European Application 21956987.8, dated Dec. 1, 2023.

*Primary Examiner* — Andrew W Johns
(74) *Attorney, Agent, or Firm* — Kilpatrick Townsend & Stockton LLP

(57) ABSTRACT

Provided are a detection method, an electronic device, and a computer-readable storage medium. The detection method includes: receiving an image of a product to be detected, and detecting a position of a preset feature point on a cover plate based on the image, where the product to be detected includes a connection piece and a cover plate, the connection piece is located on the cover plate and covers a partial region of the cover plate, and the preset feature point is located in a non-edge region on the cover plate that is not covered by the connection piece; obtaining a position of the cover plate in the image based on the position of the preset feature point and a size of the cover plate; and obtaining a position of the connection piece in the image based on the image.

10 Claims, 6 Drawing Sheets

DETECTION METHOD, ELECTRONIC DEVICE, AND COMPUTER-READABLE STORAGE MEDIUM

CROSS-REFERENCE TO RELATED APPLICATIONS

The present application is a continuation of International Application PCT/CN2021/118094, filed Sep. 14, 2021 and entitled "DETECTION METHOD, ELECTRONIC DEVICE, AND COMPUTER-READABLE STORAGE MEDIUM", which is incorporated in its entirety herein by reference.

TECHNICAL FIELD

The present application relates to the field of detection technologies, and in particular, to a detection method, an electronic device, and a computer-readable storage medium.

BACKGROUND ART

A connection piece welding procedure is extremely important in a cell production process of batteries, and plays a role in connecting a cover plate and a cell. It is important to detect an offset between a connection piece and a cover plate after welding the connection piece, so as to determine whether a position offset between the connection piece and the cover plate meets a standard.

A commonly used method for detecting an offset between a connection piece and a cover plate is as follows: A picture of the connection piece is shot by a camera, and a position of the cover plate in the picture and a position of the connection piece in the picture are captured separately based on the picture, so that the position offset between the cover plate and the connection piece is calculated. However, since an edge position of the cover plate is easily blocked during tests, for example, it may be blocked by the cell, it is difficult to capture an accurate position of the cover plate in the picture shot by the camera. As a result, the accuracy of the detected position offset between the cover plate and the connection piece is relatively low.

SUMMARY OF THE INVENTION

In view of the above problems, the present application provides a detection method, an electronic device, and a computer-readable storage medium, which can improve the accuracy of a detected position offset between a cover plate and a connection piece.

According to a first aspect, the present application provides a detection method, including: receiving an image of a product to be detected, and detecting a position of a preset feature point on a cover plate based on the image, where the product to be detected includes a connection piece and a cover plate, the connection piece is located on the cover plate and covers a partial region of the cover plate, and the preset feature point is located in a non-edge region on the cover plate that is not covered by the connection piece; obtaining a position of the cover plate in the image based on the position of the preset feature point and a size of the cover plate; obtaining a position of the connection piece in the image based on the image; obtaining an actual position of the cover plate and an actual position of the connection piece based on the position of the cover plate in the image and the position of the connection piece in the image; and detecting a position offset between the cover plate and the connection piece based on the actual position of the cover plate and the actual position of the connection piece.

In technical solutions of embodiments of the present application, since the position of the cover plate in the image is obtained based on the detected position of the preset feature point on the cover plate and the size of the cover plate, and the preset feature point on the cover plate is located in the non-edge region on the cover plate that is not covered by the connection piece, the position of the preset feature point on the cover plate in the image is not affected even if an edge position of the cover plate is easily blocked. Therefore, the position of the cover plate in the image may be accurately obtained based on the position of the preset feature point on the cover plate and the size of the cover plate, so that the actual position of the cover plate may be accurately obtained based on the position of the cover plate in the image, and the position offset between the cover plate and the connection piece may be further accurately obtained based on the accurate actual position of the cover plate and actual position of the connection piece, that is, the accuracy of the detected position offset between the cover plate and the connection piece may be improved.

In some embodiments, the receiving an image of a product to be detected, and detecting a position of a preset feature point on a cover plate based on the image includes: receiving a first image of the product to be detected that is collected by a first camera, and receiving a second image of the product to be detected that is collected by a second camera, where a first field-of-view range of the first camera overlaps a second field-of-view range of the second camera, and the sum of the first field-of-view range and the second field-of-view range is capable of fully covering the product to be detected; stitching the first image and the second image to obtain a stitched image; and detecting the position of the preset feature point on the cover plate based on the stitched image.

In the technical solutions of the embodiments of the present application, the first camera and the second camera with an overlapping region in their field-of-view ranges are separately used to collect the images of the product to be detected; since the sum of the first field-of-view range of the first camera and the second field-of-view range of the second camera is capable of fully covering the product to be detected, the first image collected by the first camera and the second image collected by the second camera are stitched, which is conducive to obtaining the stitched image that can fully cover the product to be detected, that is, the stitched image can reflect the entire product to be detected; and the position of the preset feature point on the cover plate can be detected more accurately based on the stitched image that can reflect the entire product to be detected, so that the position of the cover plate in the image can be obtained more accurately, to further improve the accuracy of the detected position offset between the cover plate and the connection piece.

In some embodiments, the stitching the first image and the second image to obtain a stitched image includes: converting pixel coordinates of the first image and pixel coordinates of the second image to those in the same coordinate system to obtain physical coordinates of the first image and physical coordinates of the second image; determining an overlapping region between the first image and the second image based on the physical coordinates of the first image and the physical coordinates of the second image; and stitching the first image and the second image based on the overlapping region between the first image and the second image, to obtain the stitched image.

In the technical solutions of the embodiments of the present application, the pixel coordinates of both the first image and the second image are converted to obtain the physical coordinates of the first image and the second image, such that the overlapping region between the first image and the second image can be accurately obtained based on the physical coordinates of the first image and the second image, and the overlapping region is used as a reference for stitching the first image and the second image, which is conducive to accurately and properly stitching the first image and the second image.

In some embodiments, the receiving a first image of the product to be detected that is collected by a first camera, and receiving a second image of the product to be detected that is collected by a second camera includes: receiving the first image of the product to be detected that is collected by the first camera under a first light source and a second light source, and receiving the second image of the product to be detected that is collected by the second camera under the first light source and a third light source, where the first light source directly faces the product to be detected, the second light source and the third light source are respectively arranged on both sides of the first light source, the second light source is located on the upper left side of the product to be detected, and the third light source is located on the upper right side of the product to be detected.

In the technical solutions of the embodiments of the present application, the first light source directly faces the product to be detected, and may illuminate the middle region of the product to be detected, such that a feature in the middle position of the product to be detected may be recognized more easily based on the first image and the second image; and the second light source and the third light source are respectively arranged on both sides of the first light source, the second light source is located on the upper left side of the product to be detected, and the third light source is located on the upper right side of the product to be detected, so that the second light source may illuminate the left region of the product to be detected, and the third light source may illuminate the right region of the product to be detected, making it easier to detect, based on the first image and the second image, features on both sides of the product to be detected, which is conducive to improving the accuracy of the obtained position of the connection piece in the image and position of the cover plate in the image.

In some embodiments, the first light source, the second light source, and the third light source are all strip light sources; and a length direction of the first light source is the same as a length direction of the product to be detected, the second light source forms a first preset angle with the first light source, and the third light source forms a second preset angle with the first light source.

In the technical solutions of the embodiments of the present application, the first light source, the second light source, and the third light source are all strip light sources suitable for large-format detection, the strip light sources have characteristics of high illumination uniformity, high brightness, good heat dissipation, long service life, and high stability and simple installation, and the angle between different strip light sources is flexible and adjustable. In the embodiments, the arrangement positions of the first light source, the second light source, and the third light source and the angles between the light sources enable the first light source, the second light source, and the third light source to provide approximately ring-shaped illumination conditions, so that the product to be detected is illuminated in all directions, that is, all parts of the product to be detected are illuminated, which is conducive to collecting clear and complete images by the first camera and the second camera.

In some embodiments, a value of the first preset angle and the second preset angle ranges from 140° to 160°.

In the technical solutions of the embodiments of the present application, when the value of the first preset angle and the second preset angle ranges from 140° to 160°, the approximately ring-shaped illumination conditions provided by the first light source, the second light source, and the third light source have better effects, which facilitates the collection of clear and complete images of the product to be detected.

In some embodiments, the first light source, the second light source, and the third light source are all stroboscopic light sources.

In the technical solutions of the embodiments of the present application, the first light source, the second light source, and the third light source are all stroboscopic light sources, which may increase an image collection speed of the first camera and the second camera, thereby increasing a speed of detecting a position offset between the cover plate and the connection piece.

In some embodiments, the preset feature point is located in the middle position on the cover plate.

In the technical solutions of the embodiments of the present application, the position of the preset feature point is set in the middle position on the cover plate, and there is an extremely small probability that the middle position on the cover plate is blocked, so that the preset feature point in the middle of the cover plate is detected more easily from the image of the product to be detected. Moreover, compared to setting the position of the preset feature point in another position on the cover plate other than the edge, in the embodiments of the present application, the position of the cover plate in the image may be obtained more conveniently based on the position of the preset feature point in the middle of the cover plate and the size of the cover plate.

According to a second aspect, the present application provides an electronic device, including: at least one processor; and a memory communicatively connected to the at least one processor, where the memory stores instructions executable by the at least one processor, and the instructions, when executed by the at least one processor, cause the at least one processor to perform the above detection method.

According to a third aspect, the present application provides a computer-readable storage medium having stored thereon a computer program that, when executed by a processor, implements the above detection method.

The aforementioned description is only an overview of the technical solutions of the present application. In order to more clearly understand the technical means of the present application to implement same according to the contents of the specification, and in order to make the aforementioned and other objects, features and advantages of the present application more obvious and understandable, specific embodiments of the present application are exemplarily described below.

BRIEF DESCRIPTION OF THE DRAWINGS

In order to illustrate the technical solutions of the embodiments of the present application more clearly, the drawings required in the description of the embodiments of the present application will be described briefly below. Obviously, the drawings described below are merely some embodiments of the present application, and for those of ordinary skill in the art, other drawings can also be obtained from these drawings without any creative efforts.

Figure 1:
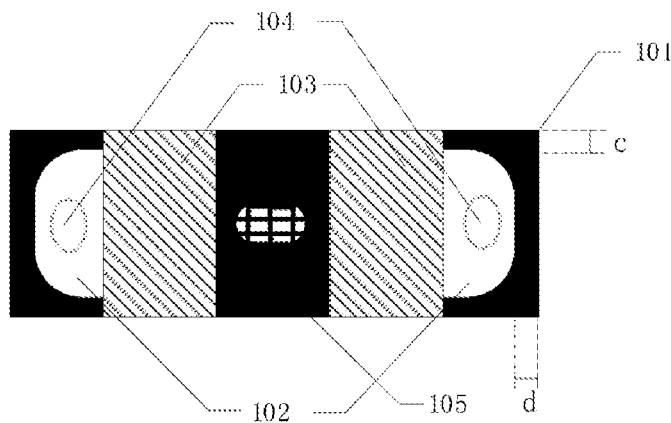
FIG. 1 is a top view of a product to be detected according to some embodiments of the present application.

In the accompanying drawings, the figures are not drawn to scale.

DETAILED DESCRIPTION OF EMBODIMENTS

The implementations of the present application will be further described in detail below in conjunction with the accompanying drawings and embodiments. The following detailed description of the embodiments and the accompanying drawings are used to illustrate the principle of the present application by way of example but should not be used to limit the scope of the present application. That is, the present application is not limited to the described embodiments.

In the description of the present application, it should be noted that "a plurality of" means two or more, unless otherwise specified. The orientation or position relationship indicated by the terms "upper", "lower", "left", "right", "inner", "outer", etc. is only for the convenience of describing the present application and simplifying the description, rather than indicating or implying that the device or element referred to must have a particular orientation or be constructed and operated in a particular orientation, and therefore should not be construed as a limitation on the present application. In addition, the terms "first", "second", "third", etc. are used for descriptive purposes only, and should not be construed as indicating or implying the relative importance. The term "perpendicular" does not mean being perpendicular in the strict sense, but within an allowable range of errors. The term "parallel" does not mean being parallel in the strict sense, but within an allowable range of errors.

The orientation terms in the following description all indicate directions shown in the drawings, but do not limit the specific structure in the present application. In the description of the present application, it should also be noted that the terms "mounting", "connecting", and "connection" should be interpreted in the broad sense unless explicitly defined and limited otherwise. For example, the terms may mean a fixed connection, a detachable connection, or an integral connection, or may mean a direct connection, or an indirect connection by means of an intermediate medium. For those of ordinary skill in the art, the specific meanings of the terms mentioned above in the present application can be construed according to specific circumstances.

At present, lithium batteries used in automobiles are mainly lithium iron phosphate batteries. Lithium iron phosphate batteries have characteristics of a high capacity, a high output voltage, good charging and discharging cycling performance, etc. A connection piece welding procedure is extremely important in a cell production process of batteries, and plays a role in connecting a cover plate and a cell. In a production process of lithium batteries, it is necessary to use a camera to detect some parameters, so as to determine whether these parameters meet a preset standard. These parameters may include: a glue spreading area, an offset between a cover plate and a connection piece, etc.

The inventor notes that detecting an offset between a connection piece and a cover plate is important after welding the connection piece, so as to determine whether a position offset between the connection piece and the cover plate meets a preset standard, and the preset standard may be, for example, whether the position offset between the connection piece and the cover plate is less than 1 mm. A commonly used method for detecting an offset between a connection piece and a cover plate is as follows: A picture of the connection piece is shot by a camera, and the position offset between the cover plate and the connection piece is calculated by capturing both a position of the cover plate in the picture and a position of the connection piece in the picture. However, since the edge position of the cover plate is easily blocked during tests, for example, it may be blocked by the cell, it is difficult to capture an accurate position of the cover plate in the picture shot by the camera. As a result, the accuracy of the detected position offset between the cover plate and the connection piece is relatively low.

To solve the problem of low accuracy of a position offset between a cover plate and a connection piece, the applicant researched and found that a main reason for the problem of the low accuracy of the position offset between the cover plate and the connection piece lies in that: a detection result of a position of a top cover in the image is inaccurate, and if the accuracy of the detection result of the position of the cover plate in the image can be improved, the accuracy of the detected position offset between the cover plate and the connection piece can be improved.

Based on the above considerations, to solve the problem of low accuracy of a position offset between a cover plate and a connection piece, the inventor designs a detection method, through in-depth studies starting from improvement of accuracy of a detection result of a position of the cover plate in an image, in which the position of the cover plate in the image is obtained based on a position of a preset feature point on the cover plate in the image and a size of the cover plate, the preset feature point on the cover plate is located in a non-edge region on the cover plate that is not covered by the connection piece, and therefore the position of the preset feature point on the cover plate in the image is not affected even if an edge position of the cover plate is easily blocked.

Therefore, the position of the cover plate in the image can be accurately obtained based on the position of the preset feature point on the cover plate and the size of the cover plate, so that the problem of low accuracy of the position offset between the cover plate and the connection piece can be solved.

The detection method disclosed in the embodiments of the present application is applied to an electronic device. The electronic device can detect a position offset between a connection piece and a cover plate in a product to be detected. The electronic device may receive an image of the product to be detected that is collected by a camera, so that the position offset between the cover plate and the connection piece is detected based on the image.

The product to be detected may be understood as a semi-finished product in a battery production process, where the product to be detected includes a connection piece and a cover plate, and the connection piece is located on the cover plate and covers a partial region of the cover plate. For example, for a top view of the product to be detected, reference may be made to FIG. 1. The product to be detected includes: a cover plate 101, a connection piece 102, a blue tape 103, and a glue spreading region 104, where the connection piece 102 is located on the cover plate 101 and covers a partial region of the cover plate 101. The middle region 105 of the cover plate 101 is not covered by the connection piece 102, and in FIG. 1, edge regions respectively at both ends of the cover plate 101 are not covered by the connection piece 102 either. It should be noted that the oblique line shadow in the blue tape 103 is only for distinguishing it from other regions, and there is actually no oblique lines on the blue tape 103. The grid region in the middle region 105 is a product form that actually exists on the cover plate.

Figure 2:
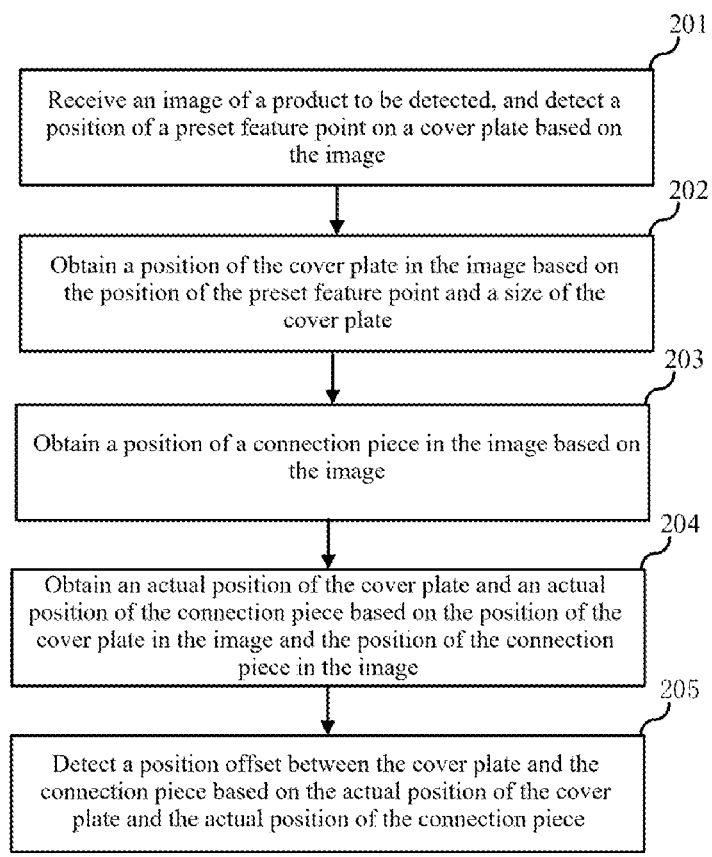
FIG. 2 is a schematic flowchart of a detection method according to some embodiments of the present application.

According to some embodiments of the present application, for a schematic flowchart of a detection method, reference may be made to FIG. 2. The detection method includes:

step 201: receiving an image of a product to be detected, and detecting a position of a preset feature point on a cover plate based on the image;

step 202: obtaining a position of the cover plate in the image based on the position of the preset feature point and a size of the cover plate;

step 203: obtaining a position of the connection piece in the image based on the image;

step 204: obtaining an actual position of the cover plate and an actual position of the connection piece based on the position of the cover plate in the image and the position of the connection piece in the image; and step 205: detecting a position offset between the cover plate and the connection piece based on the actual position of the cover plate and the actual position of the connection piece.

In step 201, the preset feature point is on the cover plate and may be selected in advance. A selection principle of the preset feature point is as follows: the preset feature point is selected from a non-edge region on the cover plate that is not covered by the connection piece. Referring to FIG. 1, the region on the cover plate that is not covered by the connection piece includes the middle region 105 and edge regions respectively at both ends of the cover plate (the black regions respectively at both ends in FIG. 1). In other words, the preset feature point may be set in the middle region 105 belonging to the non-edge region.

In an example, the preset feature point may be a point with a target feature on the cover plate. The target feature is easily recognized through visual recognition. The preset feature point on the cover plate has the target feature. Other feature points than the preset feature point on the cover plate do not have the target feature. For example, in FIG. 1, a point in the grid region in the middle position of the cover plate has a target feature, and the point in the grid region may be used as the preset feature point on the cover plate.

In specific implementation, the camera may collect an image of the product to be detected, and send the collected image of the product to be detected to the electronic device, so that the electronic device may receive the image of the product to be detected. The electronic device recognizes a feature of each point on the cover plate in the image based on the image of the product to be detected, and uses a point with the target feature as a detected preset feature point on the cover plate, so that a position of the point with the target feature in the image is used as a position of the detected preset feature point on the cover plate. In step 201, the position of the preset feature point on the cover plate that is detected based on the image is the position of the preset feature point on the cover plate in the image.

In step 202, the electronic device may obtain the position of the cover plate in the image based on the position of the preset feature point in the image and the size of the cover plate. The size of the cover plate may be a length and width of the cover plate, and the size of the cover plate may be pre-stored in the electronic device, or the size of the cover plate is input by detecting personnel and received by the electronic device when the detection method starts to be performed.

Figure 3:
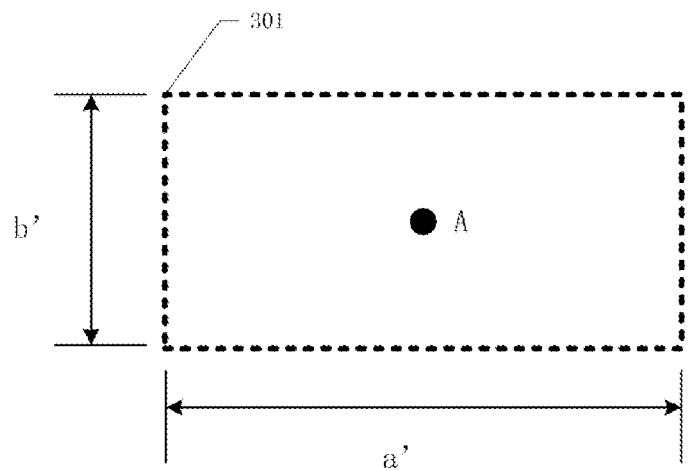
FIG. 3 is a schematic diagram of simulating a position of a cover plate in an image based on a position of a preset feature point in the image, according to some embodiments of the present application.
Figure 4:
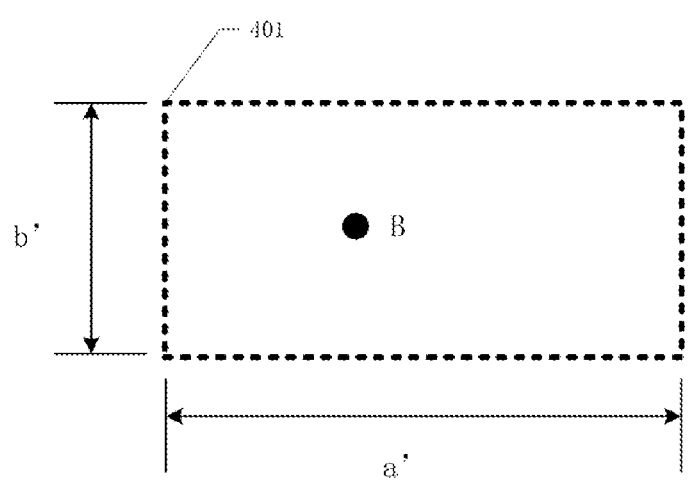
FIG. 4 is another schematic diagram of simulating a position of a cover plate in an image based on a position of a preset feature point in the image, according to some embodiments of the present application.

In specific implementation, the electronic device may simulate the position of the cover plate in the image based on the position of the preset feature point in the image and the size of the cover plate, so as to obtain the position of the cover plate in the image. For example, an upper surface of the cover plate is generally rectangular, an actual length and width of the cover plate are respectively a and b, and the length and width of the cover plate in the image are respectively a' and b'. It can be understood that, before the image is collected by the camera, the camera may be calibrated in advance to obtain a conversion coefficient between position coordinates of an object in the image and real position coordinates of the object. In specific implementation, the length and width of the cover plate in the image may alternatively be obtained based on the actual length and width of the cover plate and the conversion coefficient obtained after the calibration. Referring to FIG. 3, assuming that the preset feature point in the image is a point A, and the preset feature point is in the middle position of the cover plate, the position of the cover plate in the image that is simulated based on the length a' and width b' of the cover plate in the image may be the position of the dashed box 301. Referring to FIG. 4, assuming that the preset feature point in the image is a point B, and the preset feature point is at a center left position on the cover plate, the position of the cover plate in the image that is simulated based on the length a' and width b' of the cover plate in the image may be the position of the dashed box 401. The position of the cover plate in the image may be specifically expressed as position coordinates of the cover plate in the image.

In step 203, the electronic device may obtain the position of the connection piece in the image based on the image. For example, the electronic device may recognize the image and recognize the edge contour of the connection piece, so as to obtain the position of the connection piece in the image, that is, the position of the connection piece in the image. The position of the connection piece in the image may be specifically expressed as position coordinates of the connection piece in the image. The position coordinates of the connection piece in the image and the position coordinates of the cover plate in the image are position coordinates in the same coordinate system.

In step 204, the electronic device may obtain an actual position of the cover plate and an actual position of the connection piece based on the position of the cover plate in the image and the position of the connection piece in the image, where the actual position may be actual position coordinates. As described above, after the camera is calibrated, the conversion coefficient between position coordinates of an object in the image and real position coordinates of the object may be obtained. Therefore, the electronic device may obtain actual position coordinates of the cover plate based on the position coordinates of the cover plate in the image and the conversion coefficient, and may obtain actual position coordinates of the cover plate based on the position coordinates of the connection piece in the image and the conversion coefficient.

In step 205, the electronic device may detect a position offset between the cover plate and the connection piece based on the actual position of the cover plate and the actual position of the connection piece. The position offset between the cover plate and the connection piece may include a longitudinal offset and/or a transverse offset. Referring to FIG. 1, the longitudinal offset may be understood as a distance c, and the transverse offset may be understood as a distance d.

In some embodiments of the present application, since the position of the cover plate in the image is obtained based on the position of the detected preset feature point on the cover plate and the size of the cover plate, and the preset feature point on the cover plate is located in a non-edge region on the cover plate that is not covered by the connection piece, the position of the preset feature point on the cover plate in the image is not affected even if an edge position of the cover plate is easily blocked. Therefore, the position of the cover plate in the image may be accurately obtained based on the position of the preset feature point on the cover plate and the size of the cover plate, so that the actual position of the cover plate may be accurately obtained based on the position of the cover plate in the image, and the position offset between the cover plate and the connection piece may be further accurately obtained based on the accurate actual position of the cover plate and actual position of the connection piece, that is, the accuracy of the detected position offset between the cover plate and the connection piece may be improved.

Figure 5:
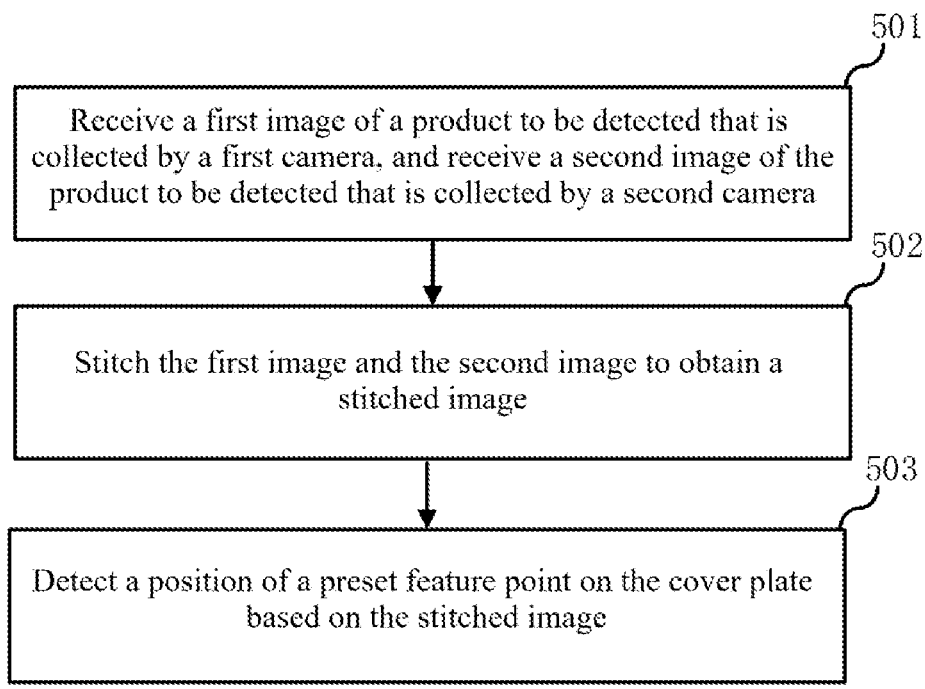
FIG. 5 is a schematic flowchart of an implementation of step 201 according to some embodiments of the present application.

According to some embodiments of the present application, for an implementation of step 201, reference may be made to FIG. 5. The implementation includes:

step 501: receiving a first image of the product to be detected that is collected by a first camera, and receiving a second image of the product to be detected that is collected by a second camera, where a first field-of-view range of the first camera overlaps a second field-of-view range of the second camera, and the sum of the first field-of-view range and the second field-of-view range is capable of fully covering the product to be detected;

step 502: stitching the first image and the second image to obtain a stitched image; and step 503: detecting the position of the preset feature point on the cover plate based on the stitched image.

In step 501, those skilled in the art may calibrate the first camera and the second camera in advance. After the first camera and the second camera are calibrated together, full field-of-view coverage of the connection piece may be implemented, that is, the sum of the first field-of-view range of the first camera and the second field-of-view range of the second camera can fully cover the product to be detected.

The sum of the first field-of-view range of the first camera and the second field-of-view range of the second camera being capable of fully covering the product to be detected may be understood as: a first partial region of the product to be detected can be shot by using the first camera, a second partial region of the product to be detected can be shot by using the second camera, and the sum of the first partial region and the second partial region cover the entire product to be detected.

The first field-of-view range overlapping the second field-of-view range may be understood as: there is an overlapping region between the first partial region and the second partial region, or may be understood as: the same region of the product to be detected can be shot by using the first camera and the second camera.

In specific implementation, the first camera may collect the first image of the product to be detected, and send the first image to the electronic device, so that the electronic device may receive the first image collected by the first camera. The second camera may collect the second image of the product to be detected, and send the second image to the electronic device, so that the electronic device may receive the second image collected by the second camera.

In an example, both the first camera and the second camera may be 20 MP black-and-white area-array cameras, the field of views of the first camera and the second camera in the X direction may be 305 mm, and the pixel accuracy may be 0.03 mm/pixel.

In step 502, the electronic device may stitch the first image and the second image to obtain a stitched image. It can be understood that the first image includes the first partial region of the product to be detected that is shot by the first camera, the second image includes the second partial region of the product to be detected that is shot by the second camera, and the stitched image includes both the first partial region of the product to be detected that is shot by the first camera and the second partial region of the product to be detected that is shot by the second camera, that is, the stitched image includes the entire product to be detected.

In specific implementation, the electronic device may stitch the first image and the second image based on the overlapping region between the first image and the second image, to obtain the stitched image that includes the entire product to be detected and has no overlapping content.

Figure 6:
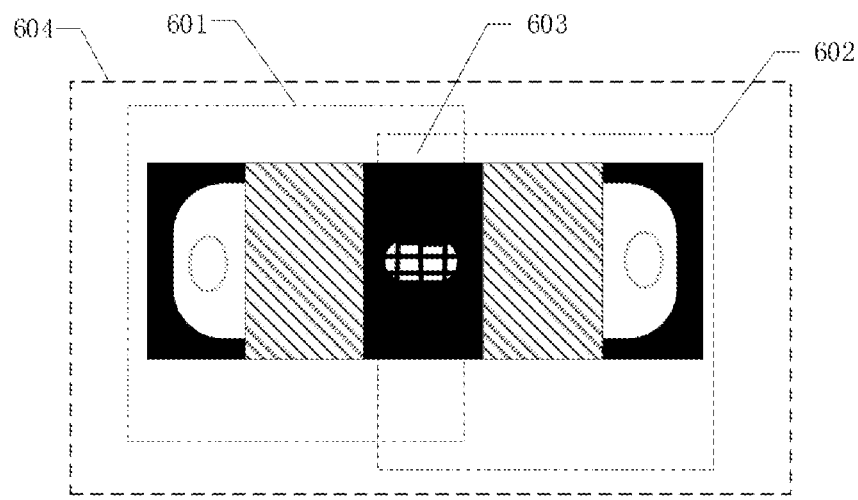
FIG. 6 is a schematic diagram of stitching a first image and a second image to obtain a stitched image according to some embodiments of the present application.

In an example, referring to FIG. 6, the first image is denoted by 601, the second image is denoted by 602, the overlapping region between the first image 601 and the second image 602 is denoted by 603, and after the first image 601 and the second image 602 are stitched, the stitched image 604 is obtained.

In step 503, the electronic device may recognize a feature of each point on the cover plate in the stitched image based on the stitched image, and uses a point with the target feature as a detected preset feature point on the cover plate, so that a position of the point with the target feature in the image is used as a position of the detected preset feature point on the cover plate. Referring to FIG. 6, the position of the preset feature point on the stitched image may be a middle point in the middle grid region.

However, in specific implementation, more cameras may be selected to collect images of the product to be detected, and the images collected by the cameras may be stitched to obtain a stitched image. For example, three cameras, four cameras, or six cameras may be arranged, and an image of the product to be detected that is collected by each camera may be received and stitched.

In some embodiments of the present application, the first camera and the second camera with an overlapping region in their field-of-view ranges are separately used to collect the images of the product to be detected; since the sum of the first field-of-view range of the first camera and the second field-of-view range of the second camera is capable of fully covering the product to be detected, the first image collected by the first camera and the second image collected by the second camera are stitched, which is conducive to obtaining the stitched image that can fully cover the product to be detected, that is, the stitched image can reflect the entire product to be detected; and the position of the preset feature point on the cover plate can be detected more accurately based on the stitched image that can reflect the whole appearance of the product to be detected, so that the position of the cover plate in the image can be obtained more accurately, to further improve the accuracy of the detected position offset between the cover plate and the connection piece.

In addition, it is also considered in the present application that the more cameras there are, the greater an calibration error may be and the more complicated a calibration process will be. However, if it is expected to collect an image that can fully cover the product to be detected by using one camera, a camera with more than one billion pixels may need to be selected. Such a camera is hard to find on the market. Although there are industrial cameras with three gigapixels, but the cost of such a camera is too high, a lens matched with this camera has to be changed accordingly, and the reserved installation space may not be enough to install an industrial camera with three gigapixels and a lens matched with the camera. Therefore, in the embodiments of the present application, two cameras are selected to collect images of the product to be detected, which may reduce calibration errors, simplify the calibration process, and help reduce costs.

Figure 7:
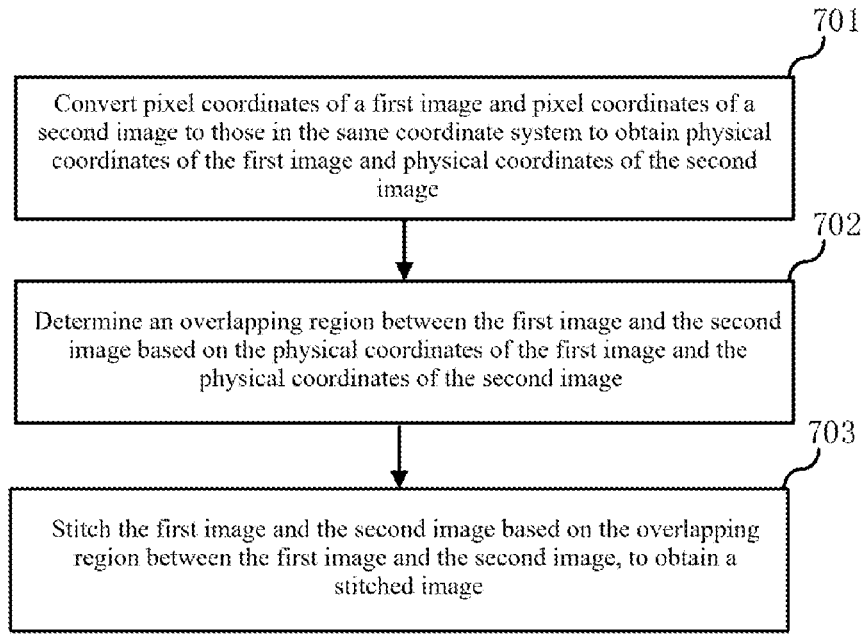
FIG. 7 is a schematic flowchart of an implementation of step 502 according to some embodiments of the present application.

According to some embodiments of the present application, for an implementation of step 502, reference may be made to FIG. 7. The implementation includes:

step 701: converting pixel coordinates of the first image and pixel coordinates of the second image to those in the same coordinate system to obtain physical coordinates of the first image and physical coordinates of the second image;

step 702: determining an overlapping region between the first image and the second image based on the physical coordinates of the first image and the physical coordinates of the second image; and step 703: stitching the first image and the second image based on the overlapping region between the first image and the second image, to obtain the stitched image.

In step 701, the pixel coordinates are related to the image resolution. Assuming that the image resolution is 1024×768, the electronic device may divide the image into 1024 rows and 768 columns, the intersections of each row and each column may form small grids one by one, each grid represents a pixel, and the row and column where the pixel is located are the pixel coordinates of the pixel. The pixel coordinates is in the unit of pixel, and pixel coordinates of a pixel may be expressed in a specific row and column. The physical coordinates may be in the unit of mm, and the origin of the coordinate system of the physical coordinates is usually the center point of the imaging plane, that is, the center point of the image. There is a conversion relationship between the pixel coordinates and the physical coordinates, and the conversion relationship may be, for example, each column of pixels and each row of pixels respectively represent specific millimeters.

In specific implementation, the electronic device may convert, based on the conversion relationship between the pixel coordinates and the physical coordinates, pixel coordinates of the first image and pixel coordinates of the second image to those in the same physical coordinate system to obtain physical coordinates of the first image and physical coordinates of the second image.

In step 702, the electronic device may recognize an image feature of the first image and an image feature of the second image. The image feature may include: a texture feature, a shape feature, a grayscale feature, a color features, etc. Then, the electronic device may compare the image feature of the first image with the image feature of the second image to obtain regions having the same image feature in the first image and the second image. Next, the electronic device may determine physical coordinates of the regions having the same image feature in the first image and the second image based on the physical coordinates of the first image and the physical coordinates of the second image, and use the physical coordinates of the regions having the same image feature in the first image and the second image as physical coordinates of the overlapping region between the first image and the second image. The overlapping region between the first image and the second image is the overlapping region 603 in FIG. 6.

In step 703, the electronic device may stitch the first image and the second image based on the physical coordinates of the overlapping region between the first image and the second image, to obtain the stitched image. For example, the overlapping region in the first image is cropped out based on the physical coordinates of the overlapping region in the first image, and the cropped first image is stitched with the second image to obtain a stitched image that includes the entire product to be detected and has no overlapping content. Alternatively, the overlapping region in the second image is cropped out based on the physical coordinates of the overlapping region in the second image, and the cropped second image is stitched with the first image to obtain a stitched image that includes the entire product to be detected and has no overlapping content. In other words, since content in the overlapping region between the first image and the second image is repeated content, the content in the overlapping region in only one image is retained during image splicing.

In some embodiments of the present application, the pixel coordinates of both the first image and the second image are converted to obtain the physical coordinates of the first image and the second image, such that the overlapping region between the first image and the second image can be accurately obtained based on the physical coordinates of the first image and the second image, and the overlapping region is used as a reference for stitching the first image and the second image, which is conducive to accurately and properly stitching the first image and the second image.

According to some embodiments of the present application, the receiving a first image of the product to be detected that is collected by a first camera, and receiving a second image of the product to be detected that is collected by a second camera in step 501 may include: receiving the first image of the product to be detected that is collected by the first camera under a first light source and a second light source, and receiving the second image of the product to be detected that is collected by the second camera under the first light source and a third light source, where the first light source directly faces the product to be detected, the second light source and the third light source are respectively arranged on both sides of the first light source, the second light source is located on the upper left side of the product to be detected, and the third light source is located on the upper right side of the product to be detected.

Figure 8:
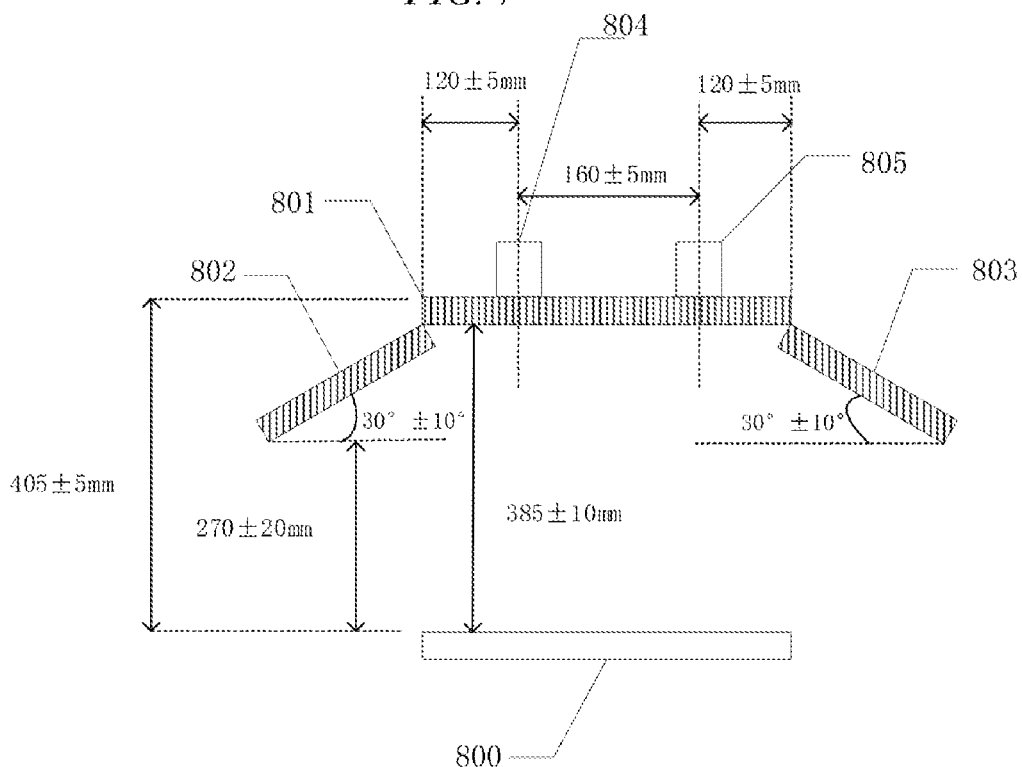
FIG. 8 is a schematic diagram of a position relationship between a product to be detected and a first camera, a second camera, a first light source, a second light source, and a third light source, according to some embodiments of the present application.

FIG. 8 is a schematic diagram of a position relationship between a product to be detected and a first camera, a second camera, a first light source, a second light source, and a third light source. The first light source 801 directly facing the product 800 to be detected may be understood as: a long-side direction of the first light source 801 is the same as a long-side direction of the connection piece in the product 800 to be detected. The second light source 802 and the third light source 803 are respectively arranged on both sides of the first light source 801, the second light source 802 is located on the upper left side of the product 800 to be detected, and the third light source 803 is located on the upper right side of the product 800 to be detected.

In some embodiments of the present application, the first light source directly faces the product to be detected, and may illuminate the middle region of the product to be detected, such that a feature in the middle position of the product to be detected may be recognized more easily based on the first image and the second image; and the second light source and the third light source are respectively arranged on both sides of the first light source, the second light source is located on the upper left side of the product to be detected, and the third light source is located on the upper right side of the product to be detected, so that the second light source may illuminate the left region of the product to be detected, and the third light source may illuminate the right region of the product to be detected, making it easier to detect, based on the first image and the second image, features on both sides of the product to be detected, which is conducive to improving the accuracy of the obtained position of the connection piece in the image and position of the cover plate in the image.

According to some embodiments of the present application, the first light source, the second light source, and the third light source are all strip light sources; and a length direction of the first light source is the same as a length direction of the product to be detected, the second light source forms a first preset angle with the first light source, and the third light source forms a second preset angle with the first light source.

Referring to FIG. 8, the first light source 801, the second light source 802, and the third light source 803 are all strip light sources suitable for large-format detection.

The length direction of the first light source 801 is the same as the length direction of the product 800 to be detected, the second light source 802 forms a first preset angle with the first light source 801, the third light source 803 forms a second preset angle with the first light source 801, and the angles between the three strip light sources are flexible and adjustable, such that light emitted by the first light source 801, the second light source 802, and the third light source 803 can irradiate the product 800 to be detected as much as possible to illuminate all regions of the product 800 to be detected, so that the first camera 804 and the second camera 805 may collect clear images under the illumination of the three light sources.

In an example, the first light source 801 may be a strip light source, the second light source 802 and the third light source 803 may be selected as ring light sources, the second light source 802 is concentric with the field-of-view center of the first camera 804, and the third light source 803 is concentric with the field-of-view center of the second camera 805.

In some embodiments of the present application, the first light source, the second light source, and the third light source are all strip light sources, and the strip light sources have characteristics of high illumination uniformity, high brightness, good heat dissipation, long service life, and high stability and simple installation. In the embodiments, the arrangement positions of the first light source, the second light source, and the third light source and the angles between the light sources enable the first light source, the second light source, and the third light source to provide approximately ring-shaped illumination conditions, so that the product to be detected is illuminated in all directions, that is, all parts of the product to be detected are illuminated, which is conducive to collecting clear and complete images by the first camera and the second camera.

According to some embodiments of the present application, a value of the first preset angle and the second preset angle ranges from 140° to 160°.

Referring to FIG. 8, the first preset angle between the second light source 802 and the first light source 801 ranges from 140° to 160°, that is, the angle between the second light source 802 and the rightward horizontal direction ranges from 20° to 40° (30°±10°). The second preset angle between the third light source 803 and the first light source 801 ranges from 140° to 160°, that is, the angle between the third light source 803 and the leftward horizontal direction ranges from 20° to 40° (30°±10°).

In an example, as shown in FIG. 8, a distance between the first camera 804 and the product 800 to be detected may be 405±5 mm, a distance between the first camera 804 and the second camera 805 may be 160±5 mm, a distance between the first light source 801 and the product 800 to be detected may be 385±10 mm, a horizontal angle between the second light source 802 and the third light source 803 may be 30°±10°, and a distance between the second light source 802 and the product 800 to be detected may be 270±20 mm. Optionally, the lengths of the second light source 802 and the third light source 803 may be 200±5 mm.

In some embodiments of the present application, when the value of the first preset angle and the second preset angle ranges from 140° to 160°, the approximately ring-shaped illumination conditions provided by the first light source, the second light source, and the third light source have better effects, which facilitates the collection of clear and complete images of the product to be detected.

According to some embodiments of the present application, the first light source, the second light source, and the third light source are all stroboscopic light sources.

An effect obtained when transient pulse light of the stroboscopic light source makes a moving object become static within the duration of the pulse light is similar to the shutter function of a camera. When increasing the strobe frequency of the stroboscopic light source, the camera may collect a series of clear images, and the stroboscopic light source is faster in a capture speed than a constant light source.

In some embodiments of the present application, the first light source, the second light source, and the third light source are all stroboscopic light sources, which may increase an image collection speed of the first camera and the second camera, thereby increasing a speed of detecting a position offset between the cover plate and the connection piece.

According to some embodiments of the present application, the preset feature point is located in the middle position on the cover plate.

Considering that the cover plate (also referred to as a top cover) is a standard part, and a region in the middle of the cover plate is a grid region, referring to FIG. 1, a point in the grid region in the middle position of the cover plate 101 is easily recognized and distinguished and may be considered as an original feature point on the cover plate. Therefore, when the preset feature point on the cover plate is selected in advance, the point in the middle position of the cover plate may be used as the preset feature point.

In some embodiments of the present application, the position of the preset feature point is set in the middle position on the cover plate, and there is an extremely small probability that the middle position on the cover plate is blocked, so that the preset feature point in the middle of the cover plate is detected more easily from the image of the product to be detected. Moreover, compared to setting the position of the preset feature point in another position on the cover plate other than the edge, in the embodiments of the present application, the position of the cover plate in the image may be obtained more conveniently based on the position of the preset feature point in the middle of the cover plate and the size of the cover plate. For example, the detected position of the preset feature point in the image may be directly used as the center point of the cover plate in the image, and the center point is the midpoint of both the length and width of the cover plate in the image. Therefore, the position of the cover plate in the image may be simulated simply and conveniently based on the position of the center point and the size of the cover plate in the image.

Figure 9:
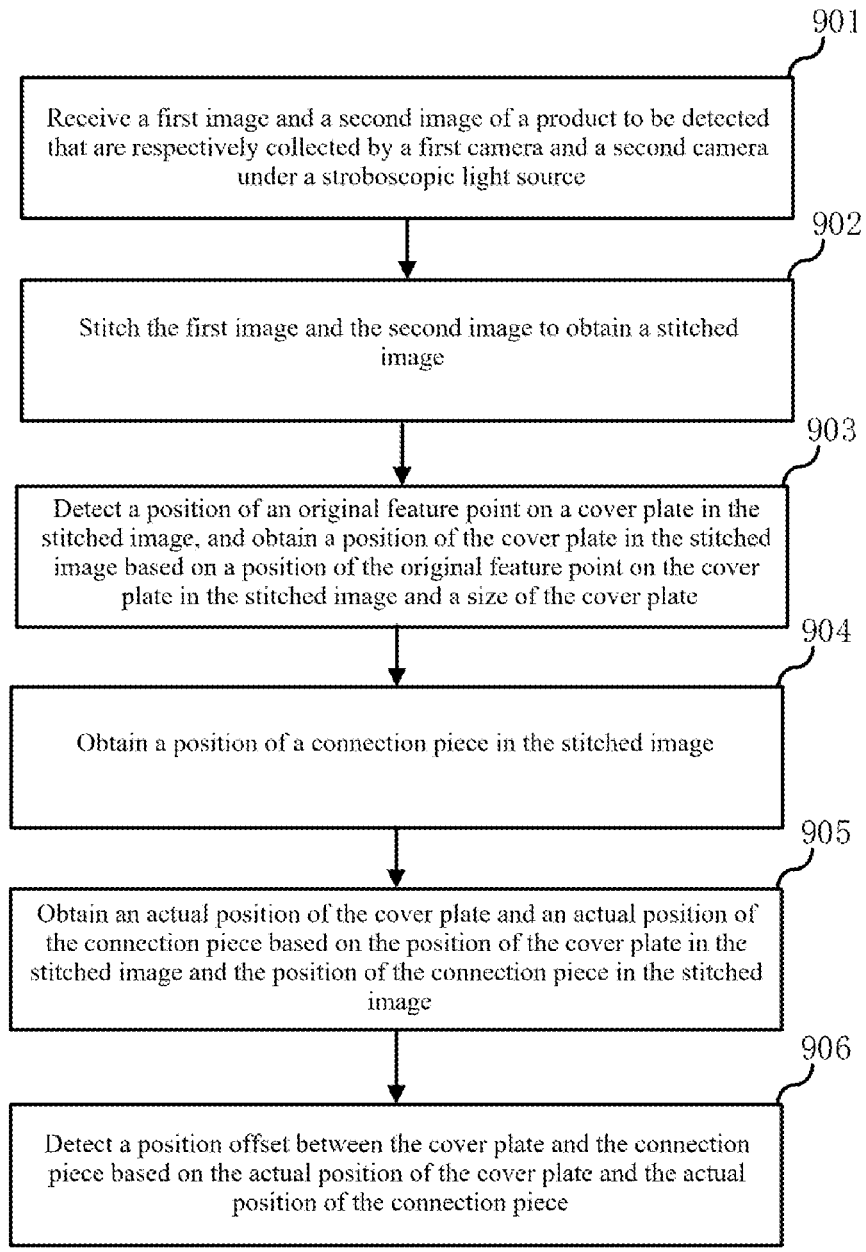
FIG. 9 is a schematic flowchart of another detection method according to some embodiments of the present application.

According to some embodiments of the present application, for a flowchart of a detection method, reference may be made to FIG. 9. The detection method includes:

step 901: receiving a first image and a second image of a product to be detected that are respectively collected by a first camera and a second camera under a stroboscopic light source;

step 902: stitching the first image and the second image to obtain a stitched image;

step 903: detecting a position of an original feature point on a cover plate in the stitched image, and obtaining a position of the cover plate in the stitched image based on a position of the original feature point on the cover plate in the stitched image and a size of the cover plate;

step 904: obtaining a position of a connection piece in the stitched image;

step 905: obtaining an actual position of the cover plate and an actual position of the connection piece based on the position of the cover plate in the stitched image and the position of the connection piece in the stitched image; and step 906: detecting a position offset between the cover plate and the connection piece based on the actual position of the cover plate and the actual position of the connection piece.

The first camera and the second camera may be 20 MP black and white area-array cameras, and the field of views of the cameras may be 305 mm maximally and 120 mm minimally. When the first camera and the second camera are calibrated, the first camera and the second camera have the same lens hardware, the same working distance, the same field of view, and the same the pixel accuracy. For the arrangement positions of the first camera and the second camera, reference may be made to FIG. 8. The first camera 804 and the second camera 805 respectively collect the first image and the second image under the first light source 801, the second light source 802, and the third light source 803. The original feature point on the cover plate is a feature point in the grid region in the middle of the cover plate. The electronic device may capture an original feature point on the cover plate in the stitched image, and obtain the position of the cover plate in the stitched image by simulation based on the size of the cover plate. In specific implementation, the electronic device may capture the position of the connection piece in the stitched image in real time.

In some embodiments of the present application, the first camera and the second camera collect images under a stroboscopic light source, which may increase a speed of image collection. The first image and the second image are stitched, which is conducive to obtaining the stitched image that can fully cover the product to be detected, so that the position of the original feature point on the cover plate is accurately recognized based on the stitched image. The position of the cover plate is obtained based on the recognized position of the original feature point on the cover plate and the size of the cover plate, so that the position offset between the cover plate and the connection piece is obtained. The original feature point on the cover plate is located in the middle position of the cover plate, and therefore is not easily affected even if an edge position of the cover plate is easily blocked. Therefore, the position of the cover plate may be accurately obtained, to improve the accuracy of the detected position offset between the cover plate and the connection piece.

The step division of the above methods is merely for clear description. During implementation, the steps may be combined into one step or some steps may be split and decomposed into multiple steps as long as they include the same logical relationship, which all fall within the scope of protection of this patent. Adding irrelevant modifications to the algorithms or processes or introducing irrelevant designs without changing the core design of the algorithms and processes all fall within the scope of protection of the patent.

Figure 10:
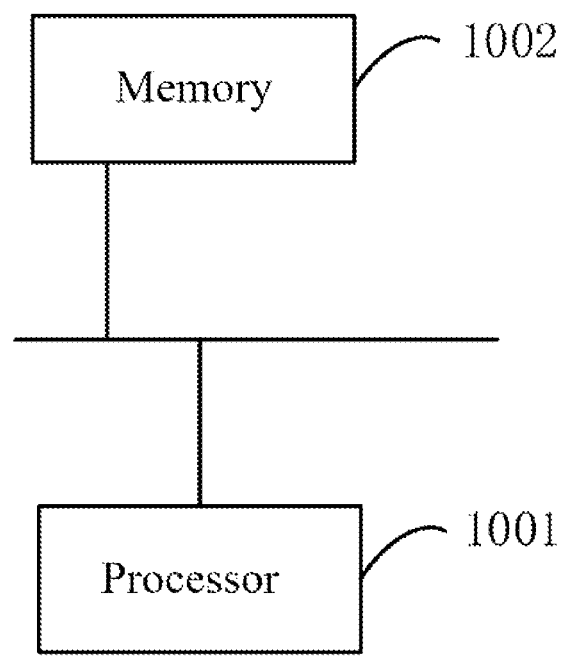
FIG. 10 is a schematic structural diagram of an electronic device according to some embodiments of the present application.

According to some embodiments of the present application, there is provided an electronic device, referring to FIG. 10, including: at least one processor 1001; and a memory 1002 communicatively connected to the at least one processor 1001, where the memory 1002 stores instructions executable by the at least one processor 1001, and the instructions, when executed by the at least one processor 1001, cause the at least one processor 1001 to perform the above detection method.

The memory 1002 and the processor 1001 are connected through a bus, the bus may include any number of interconnected buses and bridges, and the bus interconnects various circuits of one or more processors 1001 and the memory 1002. The bus may further interconnect various other circuits, for example, a peripheral device, a voltage regulator, and a power management circuit. These are all well known in the art. Therefore, no further description is provided herein. The bus interface provides an interface between the bus and the transceiver. The transceiver may be one or more elements, for example, a plurality of receivers and transmitters, and provides a unit that is configured to communicate with various other apparatuses on a transmission medium. Data processed by the processor 1001 is transmitted on a wireless medium by using the antenna. The antenna further receives data and transmits the data to the processor 1001.

The processor 1001 is responsible for managing the bus and general processing, and may further provide various functions, including timing, peripheral interfacing, voltage regulation, power management, and another control function. The memory 1002 may be configured to store data used by the processor 1001 when performing an operation.

According to some embodiments of the present application, there is provided a computer-readable storage medium storing a computer program. The above method embodiments are implemented when the computer program is executed by the processor.

In other words, those skilled in the art can understand that all or some of the steps in the methods of the above embodiments may be completed by a program instructing relevant hardware, the program is stored in a storage medium, and includes several instructions used to cause a device (which may be a single-chip microcomputer, a chip, etc.) or a processor to perform all or some of the steps of the method in various embodiments of the present application. Moreover, the storage medium includes a USB flash disk, a read-only memory (ROM), a random access memory (RAM), or a magnetic disk or optical disc or other various media capable of storing program codes.

Finally, it should be noted that the above embodiments are merely used for illustrating rather than limiting the technical solution of the present application. Although the present application has been illustrated in detail with reference to the foregoing embodiments, it should be understood by those of ordinary skill in the art that the technical solutions recorded in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, the technical features mentioned in the embodiments can be combined in any manner, provided that there is no structural conflict. The present application is not limited to the specific embodiments disclosed herein but includes all the technical solutions that fall within the scope of the claims.

The invention claimed is:

1. A detection method, comprising:
 receiving an image of a product to be detected, and detecting a position of a preset feature point on a cover plate based on the image, wherein the product to be detected comprises a connection piece and a cover plate, the connection piece is located on the cover plate and covers a partial region of the cover plate, and the preset feature point is located in a non-edge region on the cover plate that is not covered by the connection piece;
 obtaining a position of the cover plate in the image based on the position of the preset feature point and a size of the cover plate;
 obtaining a position of the connection piece in the image based on the image;
 obtaining an actual position of the cover plate and an actual position of the connection piece based on the position of the cover plate in the image and the position of the connection piece in the image; and
 detecting a position offset between the cover plate and the connection piece based on the actual position of the cover plate and the actual position of the connection piece.

2. The detection method according to claim 1, wherein receiving the image of the product to be detected, and detecting the position of a preset feature point on the cover plate based on the image comprises:
 receiving a first image of the product to be detected that is collected by a first camera, and receiving a second image of the product to be detected that is collected by a second camera, wherein a first field-of-view range of the first camera overlaps a second field-of-view range of the second camera, and the sum of the first field-of-view range and the second field-of-view range is capable of fully covering the product to be detected;
 stitching the first image and the second image to obtain a stitched image; and
 detecting the position of the preset feature point on the cover plate based on the stitched image.

3. The detection method according to claim 2, wherein the stitching the first image and the second image to obtain a stitched image comprises:
 converting pixel coordinates of the first image and pixel coordinates of the second image to those in the same coordinate system to obtain physical coordinates of the first image and physical coordinates of the second image;
 determining an overlapping region between the first image and the second image based on the physical coordinates of the first image and the physical coordinates of the second image; and
 stitching the first image and the second image based on the overlapping region between the first image and the second image, to obtain the stitched image.

4. The detection method according to claim 2, wherein receiving the first image of the product to be detected that is collected by the first camera, and receiving the second image of the product to be detected that is collected by the second camera comprises:
 receiving the first image of the product to be detected that is collected by the first camera under a first light source and a second light source, and receiving the second image of the product to be detected that is collected by the second camera under the first light source and a third light source,
 wherein the first light source directly faces the product to be detected, the second light source and the third light source are respectively arranged on both sides of the first light source, the second light source is located on the upper left side of the product to be detected, and the third light source is located on the upper right side of the product to be detected.

5. The detection method according to claim 4, wherein the first light source, the second light source, and the third light source are all strip light sources; and
 a length direction of the first light source is the same as a length direction of the product to be detected, there is a first preset angle between the second light source and the first light source, and there is a second preset angle between the third light source and the first light source.

6. The detection method according to claim 5, wherein a value of the first preset angle and the second preset angle ranges from 140° to 160°.

7. The detection method according to claim 4, wherein the first light source, the second light source, and the third light source are all stroboscopic light sources.

8. The detection method according to claim 1, wherein the preset feature point is located at the middle position on the cover plate.

9. An electronic device, comprising:
 at least one processor; and
 a memory communicatively connected to the at least one processor, wherein the memory stores instructions executable by the at least one processor, and the instructions, when executed by the at least one processor, cause the at least one processor to perform the detection method according to claim 1.

10. A non-transitory computer-readable storage medium having stored thereon a computer program that, when executed by a processor, implements the detection method according to claim 1.

* * * * *